United States Patent [19]
Epaneshnikova et al.

[11] 3,947,799
[45] Mar. 30, 1976

[54] PRINTED RESISTOR

[76] Inventors: Valentina Evgenievna Epaneshnikova, ulitsa Grazhdanskaya, 3, kv. 8; Evgenia Alexandrovna Kondratskaya, ulitsa Novo-Kuznechnaya, 10, kv. 10; Grigory Karpovich Primak, Rostovskoe shosse, 6, kv. 75; Viktor Sergeevich Umantsev, ulitsa Zipovskaya, 1, kv. 6; Svetlana Alexandrovna Okun, ulitsa Mekhanicheskaya, 5, kv. 4, all of Krasnodar, U.S.S.R.

[22] Filed: Jan. 15, 1975

[21] Appl. No.: 541,144

[52] U.S. Cl. ................................... 338/9; 338/325
[51] Int. Cl.² ................................... H01C 7/06
[58] Field of Search ............ 338/7, 9, 10, 325, 327, 338/330, 295, 319

[56] References Cited
UNITED STATES PATENTS
1,985,691  12/1934  Pugh, Jr. ............................ 338/10

FOREIGN PATENTS OR APPLICATIONS
822,020  9/1937  France ................................. 338/9

*Primary Examiner*—C. L. Albritton

[57] ABSTRACT

A printed resistor is proposed which has a laminated structure comprising a substrate and a foil current-carrying pattern attached to the substrate and provided with two current terminals and with at least one potential terminal. The current-carrying pattern is made as a network of series-parallel arms. A section of one of the parallel arms of the pattern is made of a material whose temperature coefficient of resistance exceeds that of the material of the rest of the current-carrying pattern. One side of said section is connected to one of the current terminals and the other, to one of the potential terminals. Proposed also is a method of manufacturing such printed resistors which consists in that, first, an area of the foil with a size sufficient for the temperature compensating element of the resistor to be accommodated thereon is coated with a metal layer whose temperature coefficient of resistance and the rate of solution in an etching substance are higher than those of the foil material. Then, the foil together with its coating is heat-treated at a temperature high enough for the diffusion process at the boundary between the foil and said coating to be completed. After that the foil is glued to the substrate so that its coated side is attached to the latter. The current-carrying pattern is formed as a network of series-parallel arms so that a section of at least one of the parallel arms is located on the foil area bearing the metal coating.

1 Claim, 6 Drawing Figures

PRINTED RESISTOR

The present invention relates to the technology of manufacturing printed components of electrical circuits and in particular, to printed resistors and methods of manufacturing thereof.

Widely known at present are printed resistors made as laminated structures comprising a rigid base, called substrate, and a current-carrying pattern of foil. The pattern is usually made as a certain electrical circuit and is provided with two current terminals and with at least one potential terminal.

As a rule the procedure of manufacturing such resistors consists of a number of steps, such as heat treatment of the foil, glueing the foil to the substrate, forming the pattern of a resistive alloy by photoprinting, etching the item in a solution and adjusting the resistor rating to the required value by altering the electrical circuit of the current-carrying pattern.

One of the major problems facing specialists involved in the development and production of printed resistors is to reduce the dependence of the ratings of the latter on temperature using methods of temperature compensation.

Usually the problem is solved by means of selecting proper materials to manufacture a printed resistor, viz. a resistive material having the required temperature coefficient of resistance, substrate, isolation and glueing materials having certain linear expansion ratios, as well as by means of selecting the thickness of layers of these materials and the sequence of their arrangement in the common structure. However, special attention is paid to the temperature coefficient of resistance of the resistive material and to the linear expansion ratios of said resistive material and the substrate (base).

One of the known methods of ensuring the temperature compensation of a printed resistor (see U.S. Pat. Nos. 3,405,381 and 3,517,436) consists in selecting proper materials for the substrate and the current-carrying pattern.

The temperature ratio of linear expansion of the substrate material selected for this resistor is substantially lower than that of the resistive material selected for the current-carrying pattern. Thus, the substrate was made of glass whose temperature ratio of linear expansion was $3 \times 10^{-6}/°F$.

The design of this resistor, however, suffers from two drawbacks. First, it requires that the material used for its manufacture should have quite precise and stable technical parameters.

Second, it fails to ensure a high long-period stability of resistors, since the great difference in temperature ratios of linear expansion between the epoxy resin (glueing substance) the resistive material and the glass used in the resistor results in mechanical strains in the resistive material of the current-carrying pattern which cause irreversible changes of the latter.

Widely known also are circuits where temperature compensation is ensured by means of discrete sections connected in series and having opposite temperature coefficients of resistance (TCR).

However, a resistive material with a negative TCR is not yet known at present. Hence, a semiconductor material is used to make resistor pattern sections with the negative TCR.

There is a printed resistor design (see U.S. Pat. No. 3,434,206) using materials whose temperature ratios of linear expansion are almost equal. The design of this resistor ensures a high long-period stability but fails to solve the problem of temperature compensation.

A low temperature coefficient of resistance in the resistive material can be obtained only with the help of particular metalurgical processes with subsequent heat treatment of the foil. It is the value of the foil's temperature coefficient of resistance that determines mainly the dependence of the resistor on temperature variations.

The above discussion makes it evident that neither of the attempts makes it possible to obtain printed resistors that would have maximum temperature compensation and long-term stability without requiring careful selection of materials with proper technical parameters.

The principal object of the present invention is to design a printed resistor whose rating would depend on temperature variations in the lowest possible manner and that could be made of materials having various temperature coefficients of resistance and simultaneously provide for a high long-period stability.

Another object of the present invention is to develop a method of manufacturing the printed resistor that would not require high expenditures for its realization.

The above object is achieved by means of providing a printed resistor made as a laminated structure consisting of a substrate with a current-carrying pattern of foil attached to it and provided with two current leads and with at least one potential lead in which, according to the invention, the current-carrying pattern is formed as a network of series-parallel arms where a section of at least one of the parallel arms is made of a material whose temperature coefficient of resistance is higher than that of the rest of the current-carrying pattern made of a resistive alloy, one side of said section being connected to one of the current leads and the other side, to one of the potential leads.

The above object is also achieved by means of providing a method of manufacturing the printed resistor described above which consists in heat treating the foil, glueing it to the substrate and forming the resistor's current-carrying pattern and in which, according to the invention, an area of the foil the size of which is sufficient for a temperature compensating element of the resistor to be accommodated thereon is coated, prior to the heat treatment procedure, with a layer of metal whose temperature coefficient of resistance exceeds that of the foil material and whose rate of solution in an etching substance is rather high, the foil together with the coating thereof is heat treated at a temperature high enough for the diffusion at the boundary between the foil and said coating to be completed, the foil is glued to the substrate so that its coated side is attached to the latter and the current-carrying pattern is formed as a series-parallel network of arms so that a part of at least one of the parallel arms of the network is located on the coated area of the foil.

Preferably the resultant temperature coefficient of resistance of the printed resistor is adjusted to the required value by means of varying the resistance of the temperature compensating element of the resistor after the current-carrying pattern has been formed.

Preferably also the resultant temperature coefficient of resistance of the printed resistor is adjusted to the required value by means of varying the resistance of the non-compensating element of the resistor.

The rating of the printed resistor made according to the present invention has low dependence on temperature even when it uses a resistive material with a high temperature dependence of resistance. The printed resistor may have any preset value of the temperature coefficient of resistance irrespective of the parameters of the initial resistive material. The manufacturing procedure of the resistor does not require that the parameters of the resistive material and those of the foil should be carefully selected, due regard being paid to the conditions of temperature compensation. The resistor is peculiar for the high stability of its rating, high heat transfer properties and good mechanical strength.

The proposed procedure for manufacturing the printed resistor described above consists of technological steps effected with the use of simple and available equipment.

The invention will be better understood from the following description of its embodiments given by way of example with reference to the accompanying drawings, in which.

Figure 1:
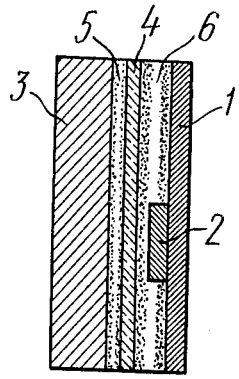
FIG. 1 shows a cross section of the printed resistor in the form of an intermediate product.

The printed resistor shown as an intermediate product in FIG. 1 (cross-sectional view) consists of a resistive material foil I an area of which is coated with a metal layer 2 and a rigid substrate 3 attached to the foil I, via a dielectric interlayer 4, with the help of glueing sheets 5 and 6.

Nichrome or manganine may be used as the resistive material, the metal layer 2 may be made of nickel or silver, the substrate 3 may be made of steel but also of aluminium, manganine, etc. The dielectric interlayer 4 is made of a glass fabric.

Figure 2:
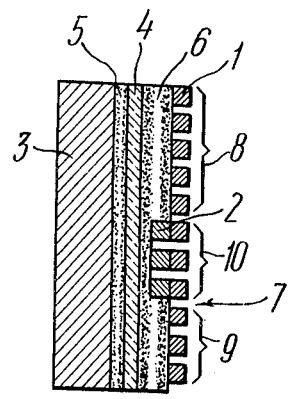
FIG. 2 shows a cross section of the printed resistor according to the invention.

FIG. 2 presents the cross section of a printed resistor which differs from the intermediate product of FIG. 1 in that it has a current-carrying pattern 7 etched out in the foil I and divided into areas 8, 9 and 10. The area 10 serving as a temperature compensating element of the resistor carries the metal coating 2.

Figure 3:
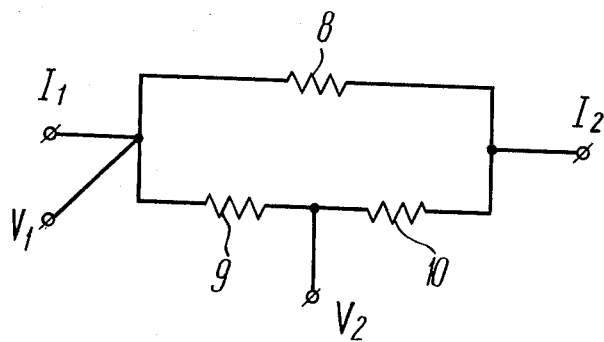
FIG. 3 shows an enlarged electrical diagram of the current-carrying pattern of the printed resistor according to the invention.

FIG. 3 presents an enlarged electrical diagram of the current-carrying pattern 7. The areas 8, 9 and 10 of the current-carrying pattern 7 are interconnected electrically in such a way that they form parallel arms with respect to current terminals $I_1$ and $I_2$, one of the arms comprising the area 8 and the other, the area 10 in series with the area 9 made of the basic resistive material. The area 10 carries the metal coating 2 whose temperature coefficient of resistance exceeds that of the resistive material. In addition the resistor is provided with two potential terminals $V_1$ and $V_2$. The area 10 of the resistor is connected between one current terminal $I_2$ and one potential terminal $V_2$.

Figure 4:
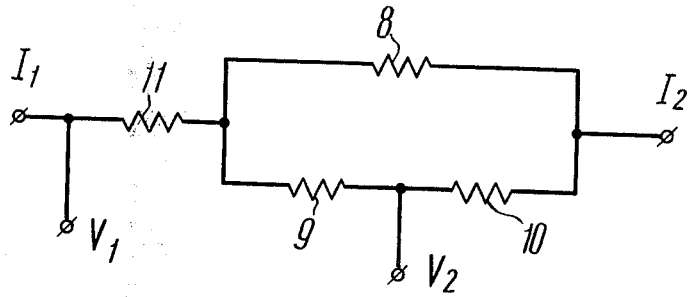
FIG. 4 shows the same for a version of the printed resistor.

FIG. 4 presents an enlarged electrical diagram of the printed resistor which differs from its version in FIG. 3 in that its current-carrying pattern has an area II connected in series to the parallel arms of the resistor. The area II has a higher resistance than the area 9 and 8 (the longer area of the current-carrying pattern). The areas 9, 8 and 11 are the resistor elements for which no temperature compensation is provided.

Figure 5:
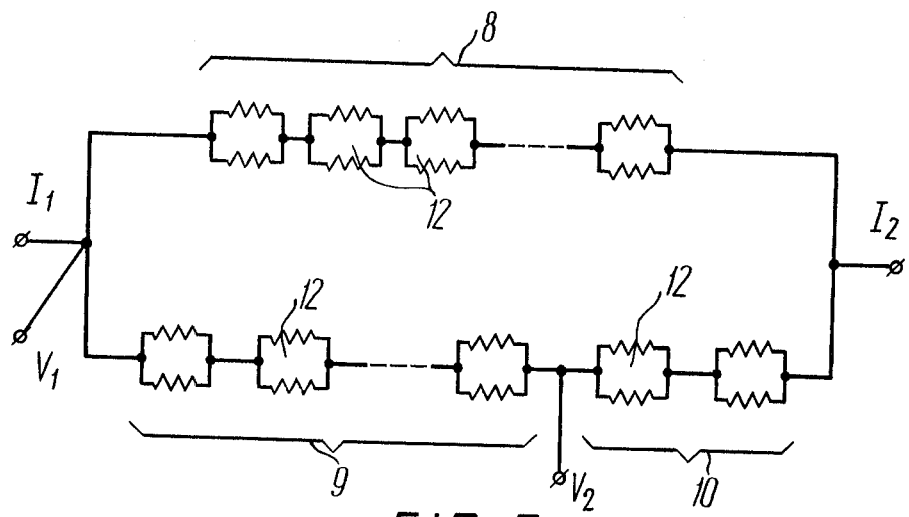
FIG. 5 shows a circuit diagram of the current-carrying pattern of the printed resistor presented in FIG. 3.

FIG. 5 presents a circuit diagram of the current-carrying pattern of the resistor from which it is evident that each of the areas 8, 9 and 10 comprises a number of sections 12 interconnected in series and formed of parallel arms. The area 11, which is not shown in FIG. 5 is arranged in the same manner.

Figure 6:
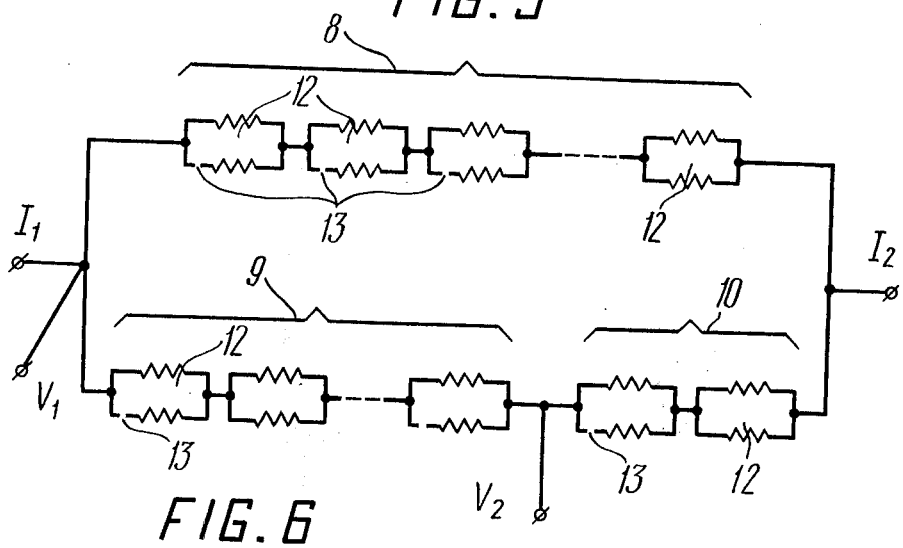
FIG. 6 shows the same after the temperature coefficient of resistance has been adjusted.

FIG. 6 presents the same circuit diagram of the resistor after its temperature coefficient of resistance has been adjusted. It is seen that certain parallel arms in some of the sections 12 are cut at points 13.

The procedure of manufacturing the printed resistor described above is as follows.

A preset area of the foil I produced by means of a metallurgical process is coated with a metal layer 2 in any of the known ways, e.g. electroplating, spraying, etc. The temperature coefficient of the resistance of the layer 2 should be much higher than that of the foil I and its rate of solution in an etching substance should exceed that of the foil I. The thickness and size of the layer 2 are determined by the relationship between the resistivites and temperature coefficients of resistance of the foil I and the layer 2, but they should be sufficient for the temperature compensating element of the resistor to be accommodated thereon.

The procedure of placing the metal coating 2 being over, the intermediate product is heat treated in a manner which is optimal to obtain the required temperature coefficients of resistance of the foil I and of the metal coating 2 and which is sufficient for the process of diffusion at the boundary between the foil I and the metal coating 2 to be completed. It is preferable that the heat treatment of the foil I should follow the process of laying the metal coating 2 because this procedure makes it possible not only to reduce the temperature coefficient of resistance of the foil I, but at the same time to raise many-fold the temperature coefficient of resistance of the metal coating 2 and to increase its adhesion to the foil I. The process of diffusion, when completed, results in achieving a high degree of long-term stability of the printed resistor.

The next step of the technological procedure consists in glueing the foil I to a rigid base (substrate 3) so that it is attached to the latter with its coated side. A dielectric interlayer 4 should be used.

Thus, a laminated structure (an intermediate product) is obtained which comprises (see FIG. 1): foil I, metal coating 2, glue layers 5 and 6, dielectric interlayer 4 and a rigid base (substrate 3).

The following step of the resistor manufacturing procedure consists in forming the current-carrying pattern 7 (FIG. 2) by photolithographic means. The result is that extra areas of the foil I and of the metal coating 2 are removed. The extra areas are etched out and the current-carrying pattern 7 is formed in such a manner that the arms become connected in a series-parallel network while a section of at least one of the parallel arms of the pattern 7 is located on that area of the foil I which carries the coating 2. After the etching procedure is over the resistor appears to have a certain current-carrying pattern. Certain sections 8, 9, 10 of the pattern 7 have the required resistance and are interconnected electrically. FIGS. 3 and 4 present examples of electrical interconnections between sections of a temperature compensated resistor where certain sections, e.g. sections 8, 9 and 11, bear no metal coating while one of the sections, namely section 10, is provided with a metal coating. The sections 8, 9 and 10 of the current-carrying pattern (cross-sectional view) are shown graphically in FIG. 2. The section II of the resistor is not shown in FIG. 2.

After the etching process is over the item is washed and dried.

The next step of the technological procedure — the adjustment of the resistor rating to the nominal value — is effected by means of altering the resistance of the sections 8, 9 and 11.

After the resistance rating is adjusted to the nominal value the printed resistor is subjected to the procedure of adjusting the resultant temperature coefficient of resistance to the required value in accordance with the principle of temperature compensation which consists in the following.

The resistor sections 8, 9 and 10 (FIG. 3) form a network of parallel arms with respect to current terminals $I_1$ and $I_2$. The section 10 bearing the metal coating 2 is connected to one of the arms in series with the section 9 which is required to provide a fixed voltage drop irrespective of variations of the temperature of the printed resistor.

In case the temperature changes redistribution of currents in parallel arms of the resistor will be observed. For instance a rise of the temperature brings about an increase of the resistances in all sections of the resistor with the subsequent change of the voltage across them. But since the temperature coefficient of resistance of the metal coating 2 of the section 10 is much higher than that of the foil I the resistance of the section 10 increases sharply, which results in a drop of the current flowing through its arm. A fall of temperature brings about a sharp decrease of the resistance of the section 10 as compared with that of the section 8, which results in redistribution of currents in parallel arms and, in particular, in an increase of the current flowing through the section 9. Hence, the dependence of the voltage drop at the section 9 of the resistor becomes low.

If a high rated but small sized resistor is required it is preferable that the resistor should have four sections connected as shown in FIG. 4, only one section II having a high resistance.

The temperature coefficient of resistance and the resistance rating are adjusted to the required values in a similar manner, i.e. by means of cutting the shunting arms.

If it is required that the temperature coefficient of resistance of a printed resistor should be zero the following relationship (for the circuit shown in FIG. 3) must hold $$R_{10} = (R_8 + R_9) \frac{\alpha_{8,9}}{\alpha_{10}}.$$

where $R_8, R_9, R_{10}$ are resistances of the sections 8, 9 and 10
$\alpha_{8,9}$ is the temperature coefficient of resistance of the initial resistive material respectively,
$\alpha_{10}$ is the temperature coefficient of resistance of the section 10 bearing the coating 2.

Therefore, it is necessary to select materials so that $$\alpha_{10} \gg \alpha_{8,9}$$

Usually, when the current-carrying pattern 7 has been formed (for instance, by means of etching) the initial resistance values $R_8$, $R_9$ and $R_{10}$ are much lower than the required nominal ratings, while the values of $\alpha_{8,9}$ and $\alpha_{10}$ are set by the characteristics of initial materials, the procedure of laying down the coating 2 and parameters of the heat treatment. After the etching procedure, these values, therefore, remain unchanged. Hence, their adjustment is effected by increasing the resistances of the sections 8, 9 and 10. There are several methods of increasing the resistances of the sections 8, 9 and 10 of the current-carrying pattern. One of them consists in altering the interconnections between certain short sections 12 of the pattern 7 by cutting parallel arms at points 13. It should be noted that the temperature coefficient of resistance and the rating of the resistor are adjusted with the use of different sections of the pattern.

The equivalent resistance of the printed resistor with respect to terminals $V_1$ and $V_2$ is determined mainly by the ratio of the resistances of the sections 8 and 9. The resistance of the section 10 is negligibly small.

In contrast to the above, the resultant temperature coefficient of resistance of the printed resistor with respect to the same terminals $V_1$ and $V_2$ is determined by the ratio of the resistance of the section 10 to the sum of the resistances of the sections 8 and 9.

The temperature coefficient of resistance of the printed resistor can be adjusted by means of manipulating with the section 10 (the temperature compensating element of the resistor).

To this end it is necessary to have a current flowing through the terminals $I_1$ and $I_2$ and, while measuring the voltage across the terminals $V_1$ and $V_2$, adjust the rating of the resistor to the required value. The resistance of the section 10 in this case will remain rather small while the resultant temperature coefficient of resistance of the printed resistor will be approximately equal to that of the resistive material $\alpha_{8,9}$. Then, it is necessary to start increasing the resistance of the section 10 and to continue doing so while monitoring the voltage at two temperatures, e.g. at 20°C and 30°C until the voltage incrmment in either zero or is equal to the required value, i.e. $U_{20°}\ c = U_{30°}\ c$ or $U_{30°}\ c - U_{20°}\ c = \Delta U$, where $\Delta U$ is the required value. Then, by varying slightly the resistances of the sections 8 and 9 it is possible to adjust the rating of the resistor to the nominal value with the required precision. The temperature coefficient of resistance in this case will remain unchanged.

The temperature coefficient of resistance of the printed resistor can also be adjusted by means of manipulating either with the section 8 or with the section 9 (the elements of the resistor having no temperature compensation).

After the etching procedure, just as in the previous case, the resistances of the sections 8 and 9 are lower than the required values while the resistance of the section 10 approaches the required value. This will correspond to the relation $$\frac{R_{10}}{R_8 + R_9} > \frac{\alpha_{8,9}}{\alpha_{10}}$$

while the intermediate product will appear to be overcompensated. To obtain optimal compensation it is necessary to adjust its value by means of increasing the resistances of the sections 8 and 9. The adjustment procedure is carried out until again one of the required relations is true ($U_{20°\ C} = U_{30°\ C}$ or $U_{30°\ C} - U_{20°\ C} = \Delta U$). The resistance of the section 10, however, remains unchanged.

A clearer understanding of the essence of the present invention may be obtained from the following example of the procedure of manufacturing printed resistors according to the invention.

EXAMPLE

1. Cut blanks 210 mm long and 70 mm wide out of a foil sheet 0.02 mm thick of a resistive alloy of the nichrome type (each blank will serve to manufacture three resistors).
2. Use a template to mark the outlines of three areas 10 × 15 mm for metal coating.
3. Apply a layer of varnish resistant to a nickel electrolyte onto the whole of the blanks surface leaving out the three areas mentioned above.
4. Coat the varnish-unprotected areas with a layer of nickel 0.01 mm thick by means of electroplating.
5. Subject the nickel coated blanks to heat treatment at a temperature from 400°C to 600°C.
6. Cut each blank 210 mm long into three intermediate products 70 mm long.
7. Using a stamp make a mark on every intermediate product with respect to the nickel coated area.
8. Glue the foil intermediate product to a steel substrate so that it is attached with its coated side to the latter having placed between them an insulation interlayer of glass fabric.
9. Coat the foil with a photoresist layer.
10. Print the image of a current-carrying pattern with terminals fixing the phototemplate with the help of the above mentioned mark.
11. Form the current-carrying pattern by means of etching.
12. Use varnish to protect the etched current-carrying pattern from mechanical damage.
13. Adjust the ratings of manufactured resistors to their nominal values.
14. Adjust the temperature coefficient of resistance to the required value.

Temperature compensated resistors manufactured in this way may be used as precision references having exact values of electrical resistance, as elements of various electric circuits providing temperature compensation of errors induced by other circuit elements, e.g. in A.C. and D.C. voltage regulators.

The field of applications of such temperature compensated resistors may be widened if they are provided with supplementary terminals so that an external variable resistor can be connected in parallel to one of the sections (8, 9 or 10). In this case it becomes possible to vary the temperature coefficient of resistance of the printed resistor in the course of operation.

Temperature compensated resistors manufactured industrially show a high accuracy of the required rating of about ±0.002 percent, temperature coefficients of resistance $\alpha = + 0.5 \times 10^{-6}/°C$, $\beta = -0.05 \times 10^{-6}/°C$ while their stability is better than ±0.001 percent per year.

What is claimed is:

1. A printed resistor comprising: a rigid substrate, a current-carrying pattern made of resistive alloy foil and fixed to said substrate, two current terminals electrically connected to said current-carrying pattern and at least one potential terminal electrically connected to said current-carrying pattern, in which said current-carrying pattern is made as a network of series-parallel arms, a section of at least one of siad series-parallel arms serving as a temperature-compensating element of the resistor is made of a material whose temperature coefficient of resistance is higher than that of the material of the rest of said current-carrying pattern, one side of said section is connected to one of said current-carrying terminals and the opposite side of said section is connected to said potential terminal.

* * * * *